United States Patent [19]
Moulton

[11] Patent Number: 5,328,277
[45] Date of Patent: Jul. 12, 1994

[54] CAGE FOR ROLLER BEARINGS

[75] Inventor: David R. Moulton, North Canton, Conn.

[73] Assignee: The Torrington Company, Torrington, Conn.

[21] Appl. No.: 151,442

[22] Filed: Nov. 4, 1993

Related U.S. Application Data

[63] Continuation of Ser. No. 96,352, Jul. 23, 1993, abandoned, which is a continuation of Ser. No. 950,616, Sep. 24, 1992, abandoned.

[51] Int. Cl.5 .................. F16C 33/46; F16C 33/10
[52] U.S. Cl. .................. 384/572; 384/470; 384/576; 384/580
[58] Field of Search .................. 384/470, 572, 580

[56] References Cited

U.S. PATENT DOCUMENTS

| | | |
|---|---|---|
| 1,491,721 | 4/1924 | Munson . |
| 1,572,453 | 2/1926 | Vanderbeek .................. 384/580 |
| 2,043,014 | 6/1936 | Shoemaker . |
| 2,053,534 | 9/1936 | Robinson . |
| 2,652,728 | 9/1953 | Kiekhaefer . |
| 3,144,284 | 8/1964 | Ortegren . |
| 3,387,901 | 6/1968 | Williams . |
| 3,586,406 | 6/1971 | Barr . |
| 4,192,560 | 3/1980 | Hartnett .................. 384/572 |
| 4,430,906 | 2/1984 | Holtzberg et al. .................. 74/595 |
| 4,472,007 | 9/1984 | De Vito . |
| 4,561,157 | 12/1985 | Johnson .................. 384/572 X |
| 4,744,679 | 5/1988 | Verburg et al. .................. 384/523 |
| 4,787,757 | 11/1988 | Finger .................. 384/470 |
| 4,874,260 | 10/1989 | Podhajecki .................. 384/470 |
| 4,881,830 | 11/1989 | Shepard et al. .................. 384/577 |
| 4,934,841 | 6/1990 | De Vito .................. 384/572 |
| 4,984,544 | 1/1991 | DeBiasse .................. 123/197 |
| 5,118,207 | 6/1992 | Ikejiri .................. 384/576 X |

FOREIGN PATENT DOCUMENTS

| | | |
|---|---|---|
| 946021 | 7/1956 | Fed. Rep. of Germany . |
| 1957881 | 11/1969 | Fed. Rep. of Germany . |
| 153111 | 11/1981 | Japan .................. 384/572 |
| 1112559 | 5/1968 | United Kingdom . |
| 1129406 | 10/1968 | United Kingdom . |
| 2216962A | 10/1969 | United Kingdom . |
| 2187804A | 9/1987 | United Kingdom . |

Primary Examiner—Thomas R. Hannon
Attorney, Agent, or Firm—John C. Bigler

[57] ABSTRACT

A bearing cage for a roller bearing. The bearing cage comprising first and second annular end rims axially spaced along a common axis and cross bars connecting the end rims such that pockets are formed between the end rims and the cross bars for retaining the rollers. Axially outward surfaces of the end rims define the axial length of the bearing cage and include at least one recess for facilitating passage of lubricant to the rollers.

19 Claims, 3 Drawing Sheets

5,328,277

CAGE FOR ROLLER BEARINGS

This is a continuation of application Ser. No. 08/096,352, filed Jul. 23, 1993, now abandoned, which is a continuation of application Ser. No. 07/950,616 filed Sep. 24, 1992, now abandoned.

BACKGROUND OF THE INVENTION

This invention relates generally to bearing cages for use with roller bearings and, more particularly, to bearing cages suitable for applications imposing high operating temperatures and severe inertia loads.

Bearing conditions existing within two- and four-cycle internal combustion engines are among the most severe. High loads, speeds, accelerations, and temperatures, particularly at crankpin and wristpin positions, make bearing selection critical. Needle roller and cage assemblies have found general acceptance as an optimum choice for meeting those extreme requirements.

Due to the proximity to combustion chambers and the piston's oscillating motion, the wristpin position has required a strong, hardened cage machined of steel and staked to retain the rollers. Commonly, such cages have end rims that are wider (axially) than would be considered normal for additional strength and to keep the roller length within connecting rod width. Minimum diameter rollers with minimum diametral clearance are used to reduce inertial loading.

In less demanding applications, bearing cages for roller bearings have been made of various polymers to minimize weight and reduce manufacturing cost. However, such polymer bearing cages have not been successful in wristpin positions and other severe applications because they lack sufficient strength and/or prevent adequate lubricant flow to the rollers.

The foregoing illustrates limitations known to exist in present cages for roller bearings. Thus, it is apparent that it would be advantageous to provide an alternative directed to overcoming one of more of the limitations set forth above. Accordingly, a suitable alternative is provided including features more fully disclosed hereinafter.

SUMMARY OF THE INVENTION

In one aspect of the present invention, this is accomplished by providing a bearing cage for a roller bearing, the bearing cage comprising first and second annular end rims axially spaced along a common axis and cross bars connecting the end rims such that pockets are formed between the end rims and the cross bars for retaining the rollers. Axially outward surfaces of the end rims define the axial length of the bearing cage and include at least one recess for facilitating passage of lubricant to the rollers.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
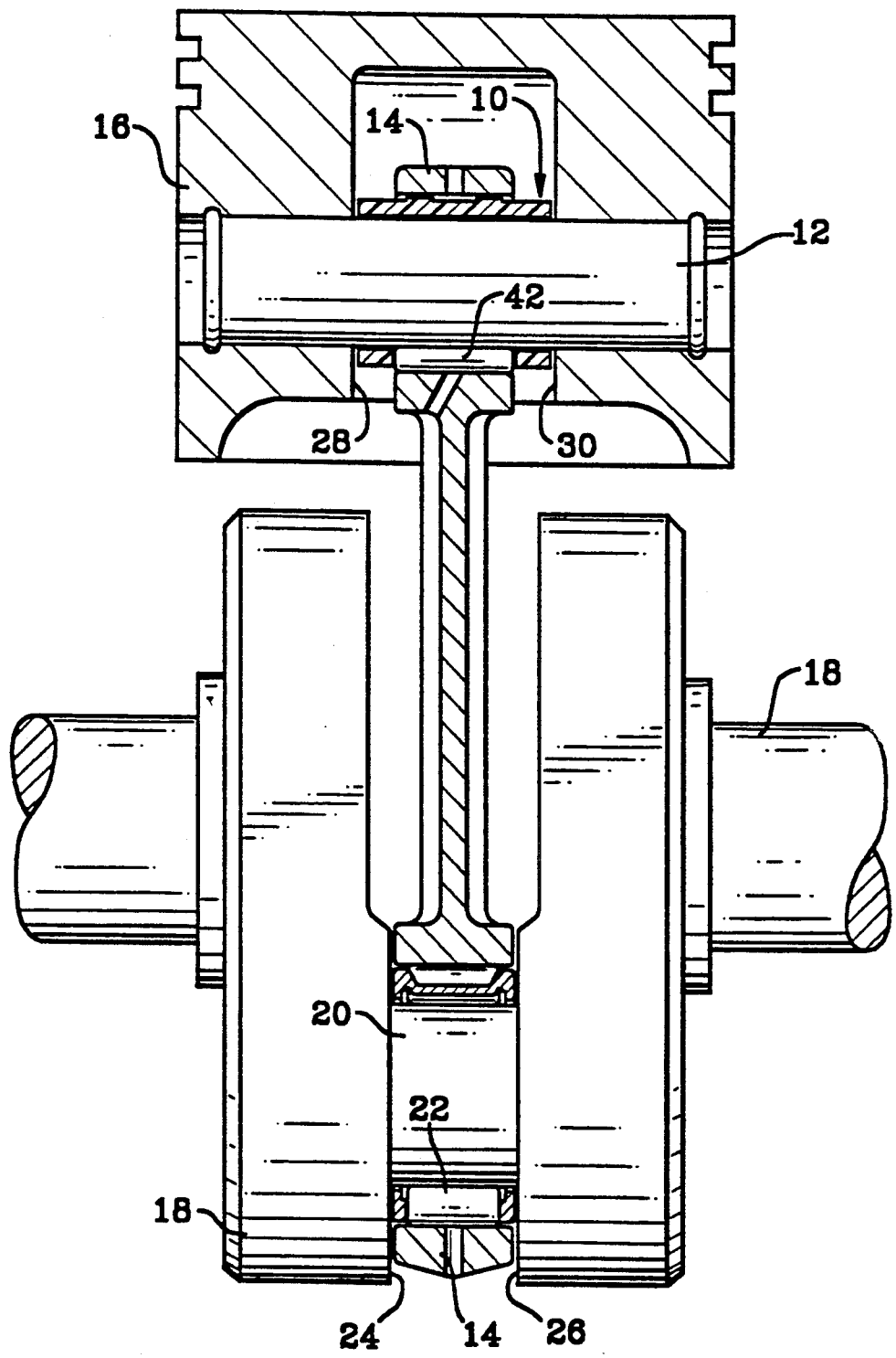
FIG. 1 is a sectional view of a portion of an internal combustion engine illustrating an embodiment of the bearing cage of the present invention.
Figure 2:
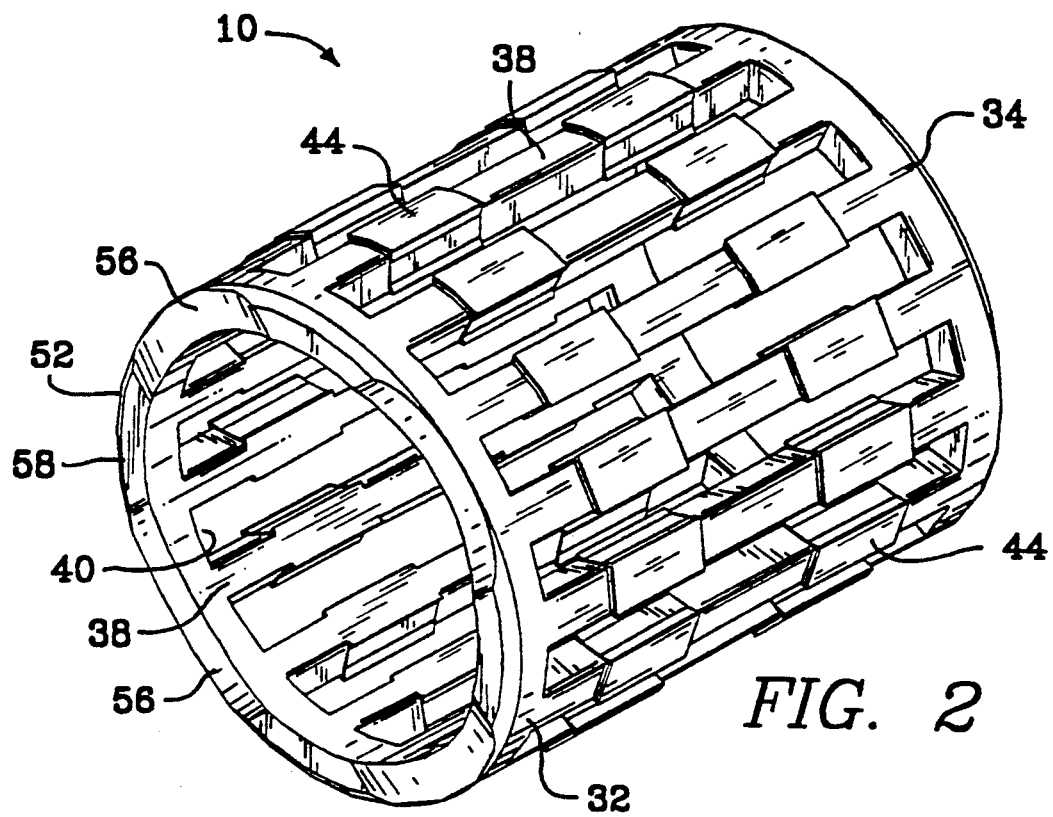
FIG. 2 is a pictorial view of the embodiment of the bearing cage of FIG. 1, showing the left end and side thereof.
Figure 3:
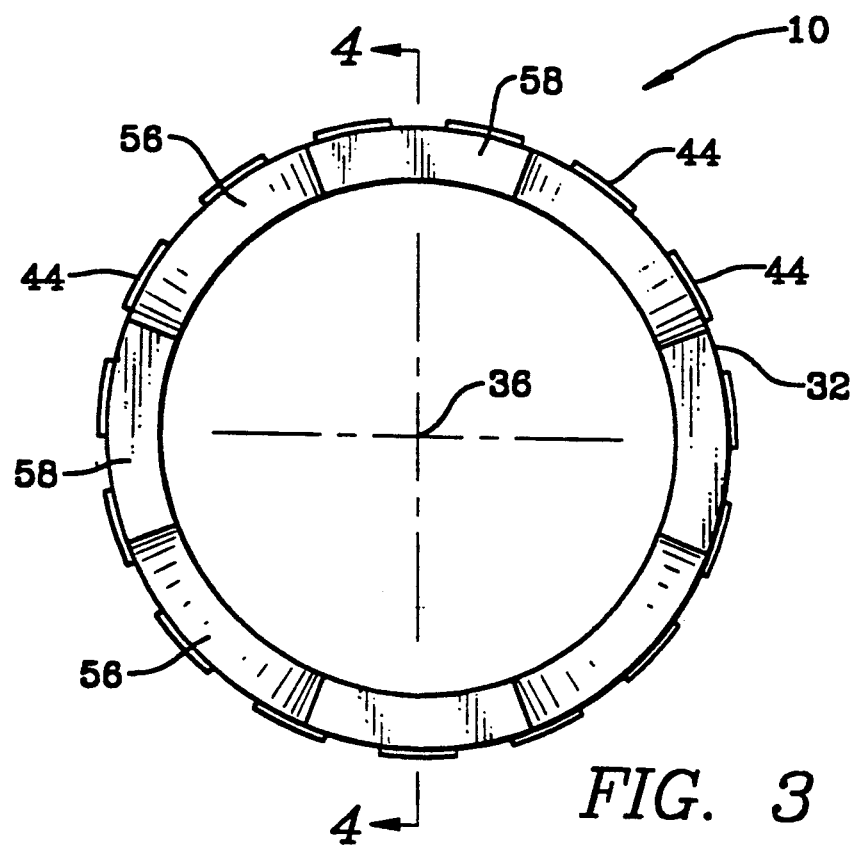
FIG. 3 is a left end view of the embodiment of the bearing cage of FIG. 1.
Figure 4:
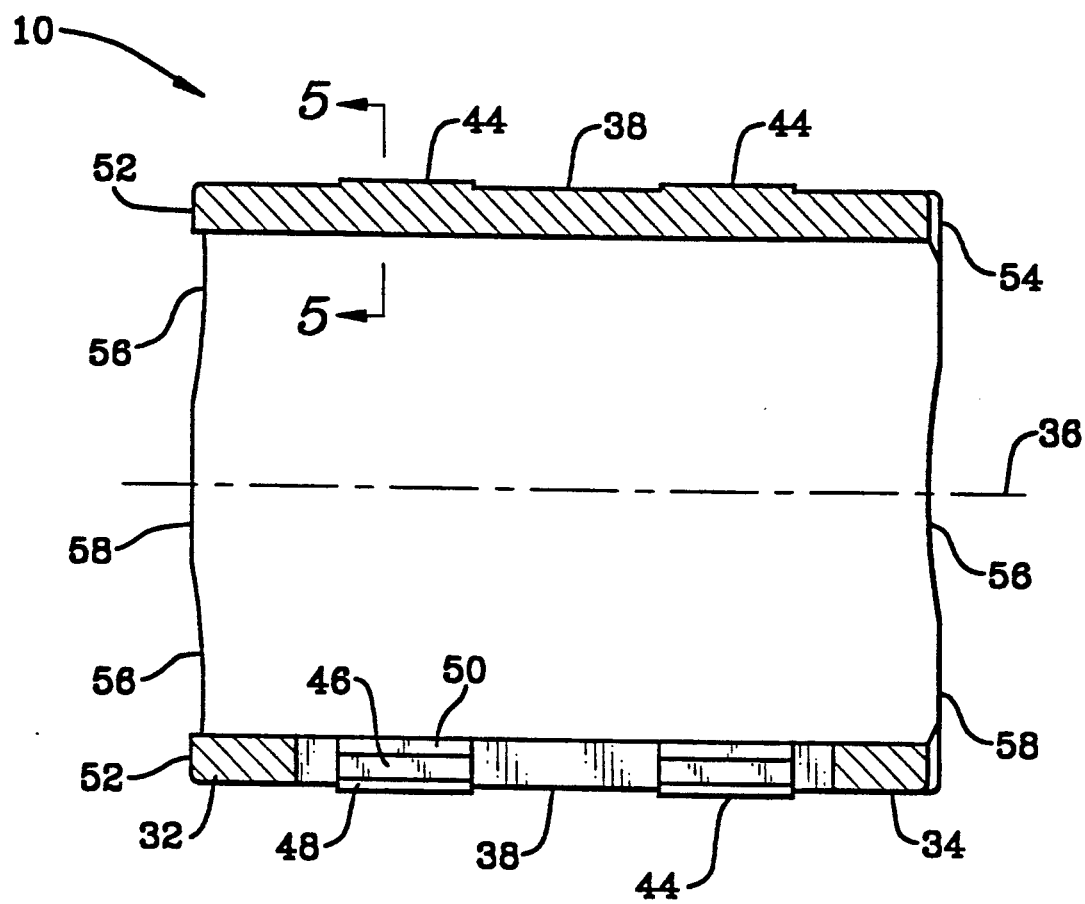
FIG. 4 is a sectional view of the embodiment of the bearing cage of FIG. 1, taken along the line 4—4 of FIG. 3.

Referring now to the drawings, FIG. 1 illustrates bearing cage 10 mounted on wristpin 12 of an internal combustion engine, partially shown. Connecting rod 14 links piston 16 to crankshaft 18 by crankpin 20 and crankpin bearing 22. Other portions of the internal combustion engine are well known and are not shown.

Traditionally, connecting rod 14 is restrained axially by contact with crankshaft webs 24 and 26. With "bottom end guidance", as such restraint is known, bearing cage 10 may be located directly between piston bosses 28 and 30, allowing connecting rod 14 to float axially. Alternatively, connecting rod 14 may be restrained axially by contact with piston bosses 28 and 30. Such restraint is known as "top end guidance".

Figure 5:
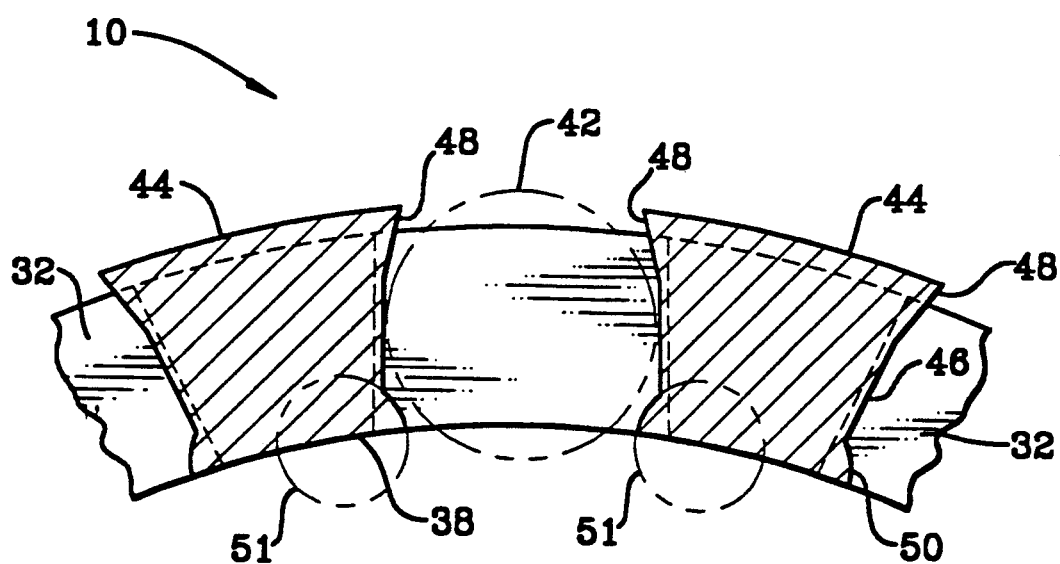
FIG. 5 is an enlarged sectional view of a portion of the embodiment of the bearing cage of FIG. 1, taken along the line 5—5 of FIG. 4.

Bearing cage 10, which can be used with either type of connecting rod axial restraint, is illustrated in greater detail in FIGS. 2 through 5. First and second annular end rims 32 and 34 are axially spaced along a common axis, indicated as 36. Cross bars 38 connect end rims 32 and 34 and form pockets 40 for rollers 42 (FIGS. 1 and 5).

Preferably, bearing cage 10 is made of a high temperature polymer so that it can withstand the harsh environment of the wristpin application. The polymer is filled with fiberglass and/or carbon fiber reinforcement to assure cage integrity under the severe loads. Polyetheretherketone (PEEK) is a particularly suitable polymer for bearing cage 10. Crankpin bearing 22 has a position somewhat less severe than bearing cage 10 and can be made with a similar construction.

The configuration of bearing cage 10 allows economical manufacture using radial draw tooling. A draft of approximately ten (10) degrees permits radially outward removal of the tooling with the limited flexibility of PEEK or similar material. The lower weight of PEEK with respect to machined steel reduces the inertial and centrifugal loading and may improve the performance and increase the life of the internal combustion engine. The lower weight may also reduce engine vibration.

To increase strength, end rims 32 and 34 and cross bars 38 have a greater thickness than usual practice. Preferably, the end rims and cross bars extend radially between eighty and eighty-five (80-85) percent of the diameter of rollers 42. Common practice requires the thickness of bearing cages to be less than seventy-five (75) percent of the roller diameter to ensure adequate lubricant flow and to avoid "cross piloting" i.e., piloting on inner and outer raceways simultaneously.

Cross bars 38 extend radially outward to form two retention pads 44 on each cross bar adjacent the ends of pockets 40. Retention pads 44 extend radially outward to a point that provides sufficient outward roller retention as well as roller movement. For example, the outer diameter of retention pads 44 may be ninety (90) percent of the diameter of rollers 42. Other portions of cross bars 38 and end rims 32 and 34 have a smaller outer diameter (e.g., 80 to 85 percent of roller diameter) to allow adequate lubricant flow to rollers 42.

The radially outward surface of retention pads 44 is cylindrical in configuration (coaxial with end rims 32 and 34) so as to avoid scraping of lubricant away from the outer bearing raceway in the path of rollers 42. In contrast, common practice provides a tent-shaped configuration including sharp outwardly extending edges. In addition to the curved shape of retention pads 44, all other edges of bearing cage 10 are blended and radii are provided in place of sharp corners (both inside and outside edges) to prevent stress risers and thereby improve bearing cage integrity during operation.

In the embodiment shown, retention pads 44 extend circumferentially into pockets 40 to form guidance pads 46. Outward retaining surfaces 48 are angled with respect to guidance pads 46 inwardly (into pockets 40) to limit outward movement of rollers 42. Inward retaining surfaces 50 are curved inwardly (into pockets 40) to limit inward movement of rollers 42. Circles 51 (FIG. 5) indicate the preferred cylindrical shape of inward retaining surfaces 50.

End rims 32 and 34 have axially outward surfaces 52 and 54, respectively, that define the axial length of bearing cage 10. Recesses 56 are provided therein for facilitating passage of lubricant to rollers 42. Various numbers and shapes of recesses 56 may be provided, depending on the size and use of the bearing cage. In the embodiment shown, four concave, cylindrical undulations are equally spaced along axially outward surfaces 52 and 54 to form recesses 56. Between those undulations, flat radial surfaces 58 serve as piloting surfaces for engaging piston bosses 28 and 30.

Preferably, end rims 32 and 34 are offset with respect to each other such that radial surfaces 58 of end rim 32 are axially opposite recesses 56 of end rim 34 and recesses 56 of end 32 are axially opposite radial surfaces 58 of end rim 34. In the preferred embodiment, recesses 58 are arcuate scallops ninety (90) degrees apart to provide locations for lubricant, and the scallops are offset forty-five (45) degrees from end rim to end rim.

It is believed that the offset between recesses 56 and radial surfaces 58 from end to end of bearing cage 10 helps keep the lubricant in the bearing. Preferably, lubricant will be forced from one end past numerous rollers to recesses 56 on the opposite end before exiting the bearing, as bearing cage 10 precesses with rotation of connecting rod 14 and resultant rotation of rollers 42. Because bearing cage 10 rides in limited axial space between piston bosses 28 and 30 and connecting rod 14, recesses 56 greatly improve lubricant flow.

Recesses 56 may be provided in a wide variety of bearing cages for widely varying applications and made of numerous materials. For example, bearing cages made of machined steel may include recesses 56 to improve lubricant flow in many bearing positions with limited axial space. The features of the present invention have wide applications and are particularly useful in outboard motor engines with operating speeds of 5,000 to 7,000 rpm.

From the above, it should be apparent that the present invention provides a polymer bearing cage with reduced weight and lower manufacturing cost than traditional bearing cages of machined steel. The particular configuration overcomes the problem of inadequate lubricant flow that would result if a bearing cage were merely made thicker to compensate for the lower strength of the polymer relative to machined steel. The configuration of the present invention also provides significant advantages in more traditional metallic bearing cages.

Having described the invention, what is claimed is:

1. A one-piece polymer bearing cage for a roller bearing, the bearing cage comprising:

first and second annular end rims axially spaced along a common axis, the end rims having axially outward surfaces defining the axial length of the bearing cage and being made of a polymer; and cross bars connecting the end rims such that pockets are formed between the end rims and the cross bars for retaining the rollers, the cross bars being made of the same polymer as the end rims;

wherein the axial length of each of the end rims varies along its circumference such that a piloting end surface of the bearing cage is provided at a longer end rim portion and such that a recessed end surface of the bearing cage is provided at a shorter end rim portion circumferentially spaced from the longer end rim portion for facilitating passage of lubricant to the rollers.

2. The bearing cage of claim 1, wherein said axially outward surface of each of the end rims includes at least one radial surface defining the axial length of the bearing cage and at least one axially inwardly extending undulation comprising said recessed end surface.

3. The bearing cage of claim 2, wherein the number of radial surfaces is four and the number of undulations is four.

4. The bearing cage of claim 2, wherein the end rims are offset with respect to each other such that the radial surface of the first end rim is axially opposite the inwardly extending undulation of the second end rim and the inwardly extending undulation of the first end rim is axially opposite the radial surface of the second end rim.

5. The bearing cage of claim 1, wherein the end rims and cross bars are molded of polyetheretherketone with a reinforcing filler.

6. The bearing cage of claim 1, wherein the crossbars include retention pads extending radially outward with respect to other portions of the cross bars and with respect to the end rims, the retention pads having retaining surfaces for engaging the rollers to limit outward movement of the rollers.

7. The bearing cage of claim 6, wherein the retention pads have a radially outward surface that is cylindrical and coaxial with the end rims for conforming to a surface of an outer bearing race.

8. A one-piece polymer bearing cage for a roller bearing, the bearing cage comprising:

first and second annular end rims axially spaced along a common axis, the end rims having axially outward surfaces defining the axial length of the bearing cage and being made of a polymer; and cross bars connecting the end rims such that pockets are formed between the end rims and the cross bars for retaining the rollers, the cross bars being made of the same polymer as the end rims;

said end rims being configured with at least one recess in said axially outward surfaces for facilitating passage of lubricant to the rollers, wherein said axially outward surface of each of the end rims includes four arcuate undulations equally spaced along the circumference thereof, the undulations comprising said at least one recess for facilitating passage of lubricant.

9. A one-piece polymer bearing cage for a roller bearing, the bearing cage comprising:
first and second annular end rims axially spaced along a common axis, the end rims having axially outward surfaces defining the axial length of the bearing cage; and
cross bars connecting the end rims such that pockets are formed between the end rims and the cross bars for retaining the rollers;
said end rims being configured with at least one recess in said axially outward surfaces for facilitating passage of lubricant to the rollers, wherein the end rims have a maximum thickness in the radial direction of at least eighty (80) percent of the diameter of the rollers.

10. A one-piece polymer bearing cage for a roller bearing, the bearing cage comprising:
first and second annular end rims axially spaced along a common axis, the end rims having axially outward surfaces defining the axial length of the bearing cage, the end rims being made of a polymer; and
cross bars connecting the end rims such that pockets are formed between the end rims and the cross bars for retaining the rollers, the cross bars being made of the same polymer as the end rims;
said end rims being configured with at least one recess in said axially outward surfaces for facilitating passage of lubricant to the rollers, wherein the end rims and the cross bars have radiused corners and blended edges for reducing stress within the bearing cage.

11. A one-piece polymer bearing cage for a bearing having rollers, the bearing cage comprising:
first and second annular end rims axially spaced along a common axis, the end rims having axially outward surfaces defining the axial length of the bearing cage, the end rims being made of a polymer and having a maximum thickness in the radial direction of at least eight (80) percent of the diameter of the rollers; and
cross bars connecting the end rims such that pockets are formed between the end rims and the cross bars for retaining the rollers, the cross bars made of the same polymer as the end rims;
the crossbars having retention pads extending radially outward with respect to other portions of the crossbars and with respect to the end rims, the retention pads having retaining surfaces for engaging the rollers to limit outward movement of the rollers.

12. The polymer bearing cage of claim 11, wherein said end rims are configured with at least one recess in said axially outward surfaces for facilitating passage of lubricant to the rollers.

13. The polymer bearing cage of claim 11, wherein the axial length of each of the end rims varies along its circumference such that a piloting surface is provided at a longer axial portion and said at least one recess is provided at a shorter axial portion.

14. The polymer bearing cage of claim 11, wherein said axially outward surface of each of the end rims includes at least one radial surface defining the axial length of the bearing cage and at least one axially inwardly extending undulation comprising said at least one recess.

15. The polymer bearing cage of claim 14, wherein the number of radial surfaces is four and the number of undulations is four.

16. The polymer bearing cage of claim 14, wherein the end rims are offset with respect to each other such that the radial surface of the first end rim is axially opposite the inwardly extending undulation of the second end rim and the inwardly extending undulation of the first end rim is axially opposite the radial surface of the second end rim.

17. The polymer bearing cage of claim 14, wherein said axially outward surface of each of the end rims includes four arcuate undulations equally spaced along the circumference thereof, the undulations comprising said at least one recess for permitting passage of lubricant.

18. The polymer bearing cage of claim 11, wherein the end rims and cross bars are molded of polyetheretherketone with a reinforcing filler.

19. The polymer bearing cage of claim 18, wherein the retention pads have a radially outward surface that is cylindrical and coaxial with the end rims for conforming to a surface of an outer bearing race.

* * * * *